Patented Oct. 25, 1927.

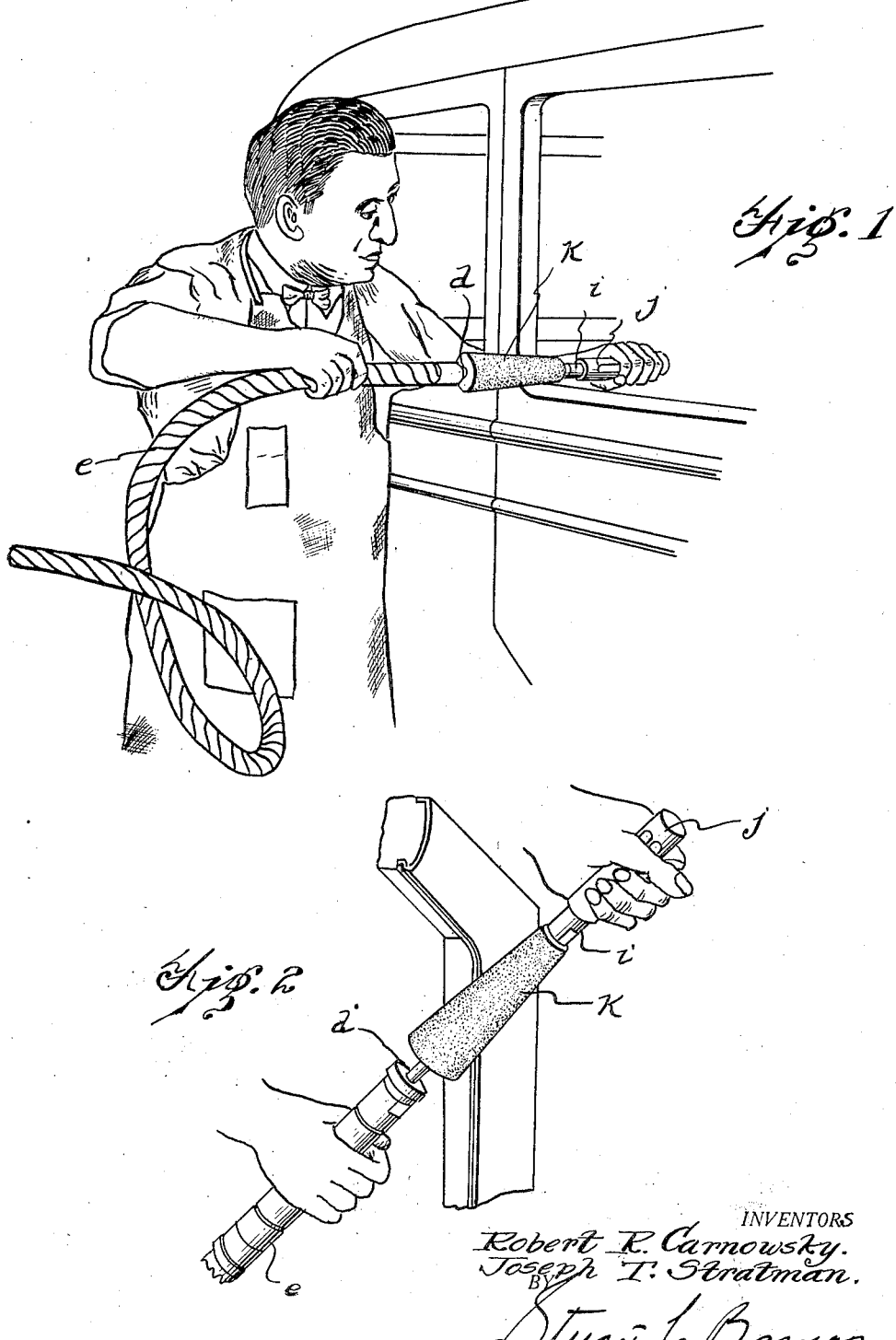

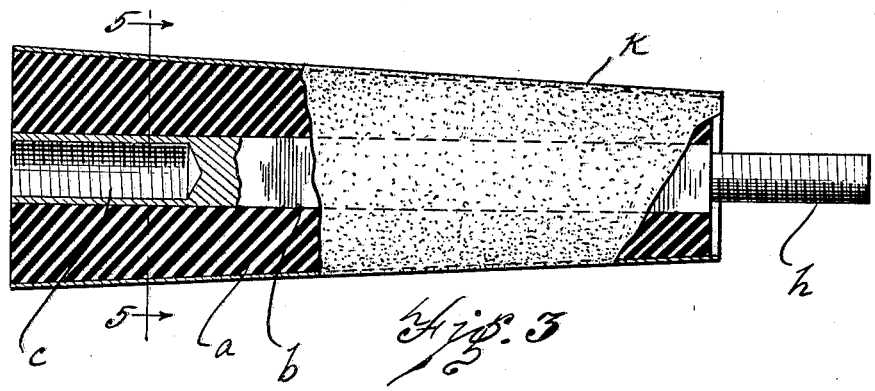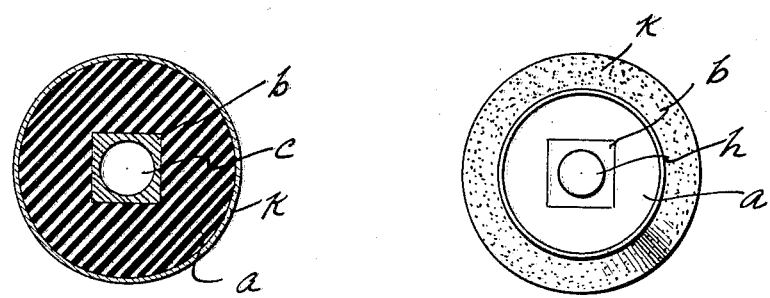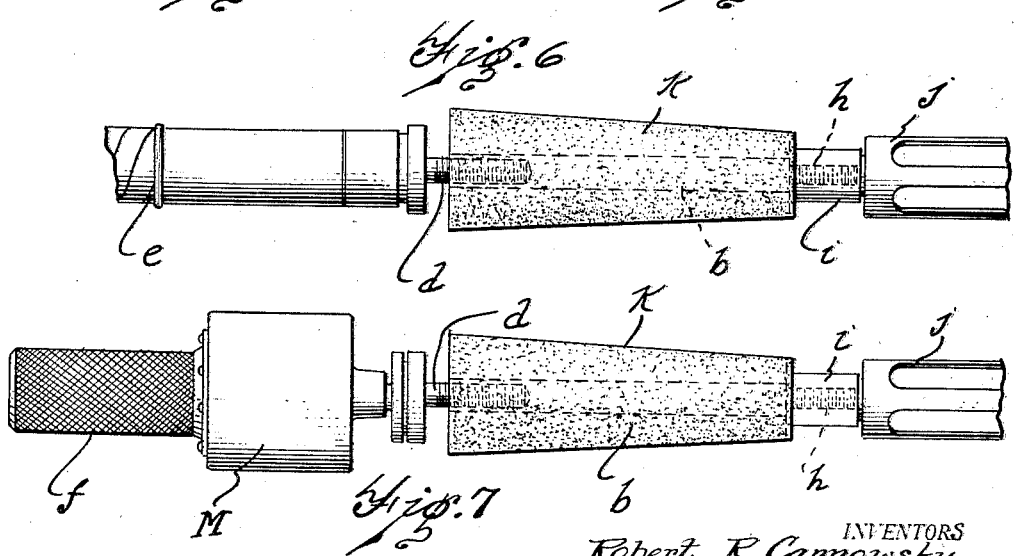

1,646,852

UNITED STATES PATENT OFFICE.

ROBERT R. CARNOWSKY AND JOSEPH T. STRATMAN, OF DETROIT, MICHIGAN, ASSIGNORS, BY MESNE ASSIGNMENTS, TO GENERAL MOTORS CORPORATION, OF DETROIT, MICHIGAN, A CORPORATION OF DELAWARE.

ABRADING TOOL AND METHOD OF PREPARING AUTOMOBILE BODIES FOR FINISHING.

Application filed October 22, 1925. Serial No. 64,068.

This invention relates to a portable abrading apparatus, and also a method of preparing automobile bodies for finishing.

Automobile bodies are now provided with sheet metal door panels and window frames, in which the corners and the fillets at the corners have to be trimmed and dressed by filing by the use of abraiding paper or cloth. These corners or fillets in a good many cases present welded seams in which the burr, or surplus metal has to be carefully trimmed off. It has been customary heretofore, to do all this trimming by hand filing and emery paper or with cloth having a surface of abraiding material. This has been a slow and rather expensive operation.

The object of the present invention is to provide an apparatus for doing this work more expeditiously and cheaply, and also to afford a method of preparing these portions of an automobile body for finishing.

In the drawings:

Fig. 1 is a perspective view showing an operator using one form of this portable tool.

Fig. 2 is a similar view showing the tool being employed in a different location.

Fig. 3 is an elevational view of the tool partly in section.

Fig. 4 is an elevation of the same.

Fig. 5 is a cross section on the line 5—5 of Fig. 3.

Fig. 6 is a fragmentary elevational view of the tool.

Fig. 7 shows a modified form of the portable apparatus.

The tool itself comprises a conical core of yieldable material preferably rubber, designated $a$ and in this is secured a shaft $b$ into one end of which at $c$ screws the driving member $d$ on a flexible shaft (not shown), that is contained in the flexible tube $e$. However, the driving member might be attached to the armature of a motor M which can be supported by a handle $f$. The opposite end of the shaft $b$ is provided with a threaded stud portion $h$ which screws into the arbor $i$ which is rotatably supported in the handle $j$.

It will be readily seen that the arbor and the handle may be disconnected from the yieldable cone, and the conical shell $k$ slipped off the core. This shell $k$ is preferably cloth coated with an abrasive such as carborundum, emery, or any other suitable material. These shells are held on simply by the friction of the cone and may be readily disengaged. One of these shells can be had for a fraction over six cents, and it is found that it will do for about 127 windows before it has to be renewed. Not only is this method of finishing the corners of windows a great saving in the labor cost, but it is found that it makes a very much more efficient use of the abrasive medium and consequently it takes less material.

We find that it is very desirable to use a yieldable core. If a solid non-yieldable core is used it "burns the work", that is, it grinds or eats into the work too quickly to get the careful results that have heretofore been obtained by hand operation. Furthermore, it wears the abrading shells out too fast. The yieldable core provides just enough give to get the desirable result. Furthermore with the yieldable conical core it is possible to hold the abrading shells on by simple friction clutch action, by simply slipping them up in place, and then the pressure on the work serves to cause them to clutch the core. Furthermore, the conical arrangement is very useful in getting into the corners, as it provides a grinding wheel with a large number of variations of diameter to suit any contour that may be encountered within the given limits.

What we claim is:

1. A portable apparatus for finish surfacing automobile bodies or the like, having in combination a portable driving member manipulated by hand, a handle and a conical abrading member rotatably supported between the handle and the source of power and rotated by the latter, said abraiding member comprising a conical abrasive shell fitting over and rotated by a supporting conical body of a sufficient mass of sufficiently yieldable material to cushion the first engagement of the abrasive and avoid burning the work.

2. A portable apparatus for finish surfacing automobile bodies or the like, having in combination a portable driving member manipulated by hand, a handle and a conical abrading member rotatably supported between the handle and the source of power and rotated by the latter, said abraiding member comprising an abrasive shell fitting over and rotated by a supporting conical body of relatively large mass, said conical body presenting an abrasive surface to fit any fillet or contour and said handle effecting finishing of the work by permitting accurate guiding and supporting of each end of the abrading tool.

3. A portable apparatus for finish surfacing automobile bodies or the like, having in combination a portable driving member manipulated by hand, a handle and a conical abrading member rotatably supported between the handle and the source of power and rotated by the latter, said abrading member comprising a conical abrasive shell rotatably supported by a conical body of rubber said handle permitting the apparatus to be grasped by the two hands and the desired surface of the abrading cone accurately guided and moved over the work to finish the same.

4. A portable apparatus for finish surfacing automobile bodies or the like, having in combination a portable driving member manipulated by hand, a handle and a conical abrading member rotatably supported between the handle and the source of power, said abrading member comprising a conical abrasive shell of emery cloth rotatably supported by a conical body of rubber, whereby the abrasive surface of the right diameter may be contacted with the desired contour or surface of the work, and each handle grasped to accurately move the abrading surface transversely of the work.

In testimony whereof we affix our signatures.

ROBERT R. CARNOWSKY.
JOSEPH T. STRATMAN.